United States Patent
Mallya et al.

(10) Patent No.: US 8,417,319 B2
(45) Date of Patent: Apr. 9, 2013

(54) VISUALIZATION AND QUANTIZATION OF NEWLY FORMED VASCULATURE

(75) Inventors: Yogish Mallya, Bangalore (IN); Lyubomir Zagorchev, Lebanon, NH (US); Narayanan Ayyakad Krishnan, Bangalore (IN)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/128,881

(22) PCT Filed: Oct. 29, 2009

(86) PCT No.: PCT/IB2009/054816
§ 371 (c)(1),
(2), (4) Date: May 12, 2011

(87) PCT Pub. No.: WO2010/055431
PCT Pub. Date: May 20, 2010

(65) Prior Publication Data
US 2011/0213243 A1    Sep. 1, 2011

Related U.S. Application Data

(60) Provisional application No. 61/115,203, filed on Nov. 17, 2008.

(51) Int. Cl.
*A61B 6/03* (2006.01)

(52) U.S. Cl.
USPC ........... 600/425; 600/481; 382/128; 382/131; 382/132

(58) Field of Classification Search .................. 600/425, 600/481; 382/128, 131, 132
See application file for complete search history.

(56) References Cited

U.S. PATENT DOCUMENTS

| | | | |
|---|---|---|---|
| 6,718,054 B1 | 4/2004 | Lorigo et al. | |
| 7,024,027 B1 | 4/2006 | Suri et al. | |
| 2008/0159604 A1 | 7/2008 | Wang et al. | |
| 2009/0296999 A1 * | 12/2009 | Raundahl et al. | 382/128 |
| 2011/0103657 A1 * | 5/2011 | Kang et al. | 382/128 |
| 2012/0150048 A1 * | 6/2012 | Kang et al. | 600/481 |

FOREIGN PATENT DOCUMENTS

| | | |
|---|---|---|
| EP | 1653410 A1 | 5/2006 |
| WO | 03042921 A1 | 5/2003 |
| WO | 2008085048 A1 | 7/2008 |

OTHER PUBLICATIONS

Frangi, A. F., et al.; Multiscale Vessel Enhancement Filtering; 1998; Lecture Notes in Computer Science; Springer; vol. 1496; pp. 130-137.
Frangi, A. F., et al.; Model-Based Quantitation of 3-D Magnetic Resonance Angiographic Images; 1999; IEEE Trans. on Medical Imaging; 18(10)946-948.
Kirbas, C., et al.; Vessel Extraction Techniques and Algorithms: A Survey; 2003; Third IEEE Symposium on Bioinformatics and Bioengineering; pp. 238-245.
Koller, T. M., et al.; Multiscale Detection of Curvilinear Structures in 2-D and 3-D Image Data; 1995; 5th Int'l Conf. on Computer Vision; pp. 864-869.
Mallya, Y., et al.; Automatic quantification of neo-vasculature from Micro-CT; 2009; Proc. of SPIE: Medical Imaging-Image Processing; vol. 7259:1-7.
Merchant, F. A., et al.; Semi-automatic Morphological Measurements of 2-D and 3-D Microvascular Images; 1994; Proc. Int'l Conf. on Image Processing; vol. 1:416-420.
Sato, Y., et al.; 3D Multi-Scale Line Filter for Segmentation and Visualization of Curvilinear Structures in Medical Images; 1997; Lecture Notes in Computer Science; vol. 1205:213-222.
Sato, Y., et al.; Three-dimensional multi-scale line filter for segmentation and visualization of curvilinear structures in medical images; 1998; Medical Image Analysis; 2(2)143-168.

* cited by examiner

*Primary Examiner* — Tse Chen
*Assistant Examiner* — Baisakhi Roy

(57) ABSTRACT

An angiographic image processing system includes a filtering module (40) configured to filter an angiographic image based on blood vessel diameter (46) to identify neovasculature having small blood vessel diameter, and a display sub-system (32, 70) configured to display the angiographic image with the identified neovasculature. A neovasculature density computation module (72) is configured to compute density of the neovasculature identified by the filtering module (40).

16 Claims, 4 Drawing Sheets

No neovasculature filtering

Figure 1:
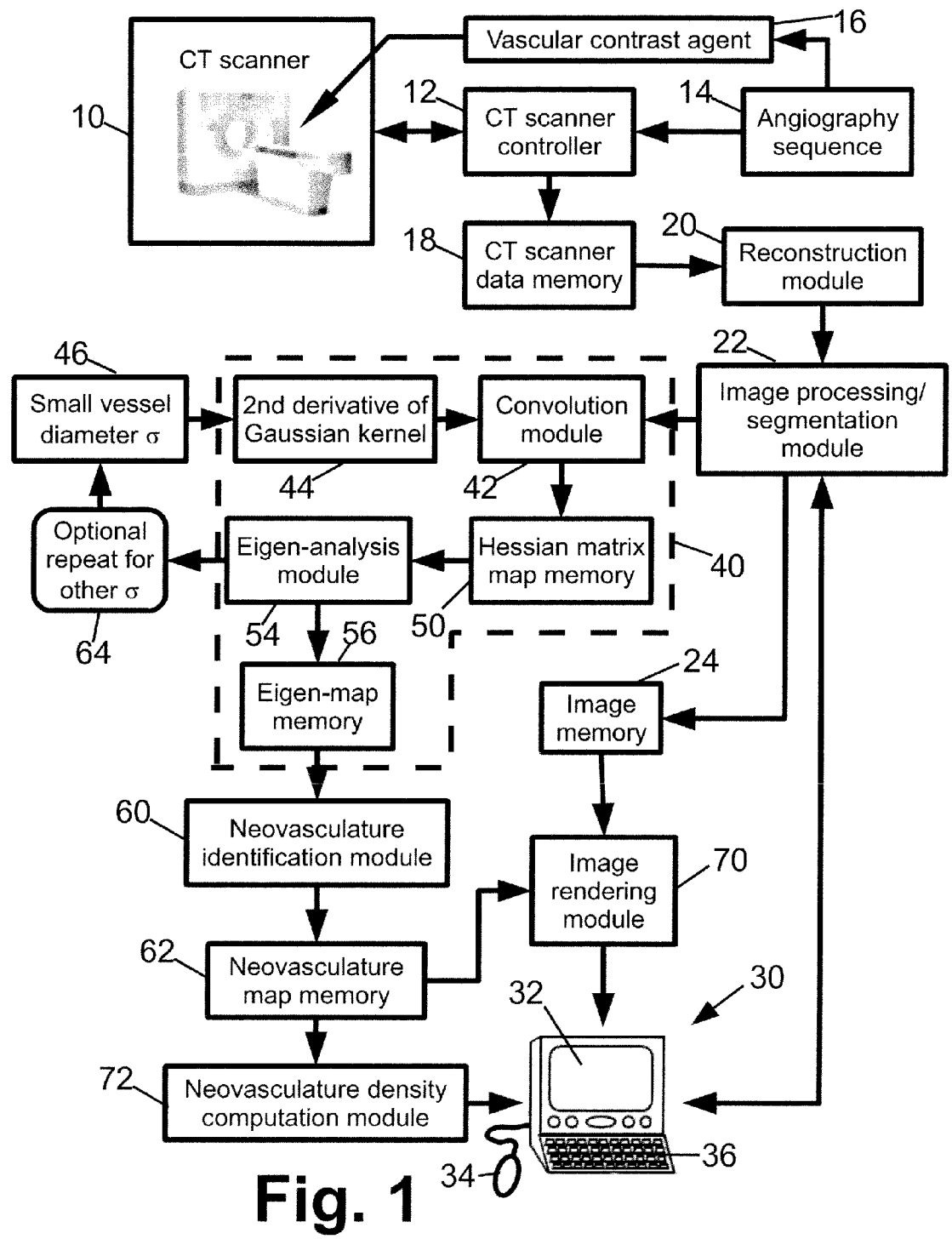

Neovasculature filtering
σ = 0.06 cm

Neovasculature filtering
σ = 0.03 cm

Neovasculature filtering
σ = 0.01 cm

US 8,417,319 B2

VISUALIZATION AND QUANTIZATION OF NEWLY FORMED VASCULATURE

CROSS REFERENCE TO RELATED APPLICATIONS

This application claims the benefit of U.S. provisional application Ser. No. 61/115,203 filed Nov. 17, 2008, which is incorporated herein by reference.

The following relates to the medical arts, medical imaging arts, and related arts.

Proliferation of neovasculature is a known indicator of growth in cancerous tumors. Accordingly, accurate characterization of neovasculature density is a metric for cancer growth, and spatial mapping of neovasculature can map the spread of cancerous tumors. Advantageously, numerous imaging modalities including computed tomography (CT), magnetic resonance (MR), and others can be configured to detect vasculature, in some configurations aided by an intravascularly administered blood-borne contrast agent. These techniques are sometimes referred to as "angiography", for example magnetic resonance angiography.

Although angiography is known, the characterization of neovasculature is complicated by the existence of preexisting vasculature. Cancerous tumors tend to have high vascular density, and the vessel diameters of more established vasculature tends to be larger than that of the neovasculature, which complicates detection and measurement of recently formed neovasculature. Surrounding healthy tissue also contains substantial vasculature that can obscure the neovasculature.

One approach is to measure a baseline vascular concentration, and to use this baseline as a reference for subsequent vascular measurements. This approach, however, presupposes the existence of an early baseline measurement acquired prior to substantial vascular growth, which is sometimes not the case when a cancerous tumor is detected or imaged at a late stage.

The following provides a new and improved apparatuses and methods which overcome the above-referenced problems and others.

In accordance with one disclosed aspect, a method is disclosed for imaging neovasculature, the method comprising: acquiring an angiographic image; filtering the angiographic image based on blood vessel diameter to identify vasculature having small blood vessel diameter as neovasculature; and displaying the angiographic image with the identified neovasculature.

In accordance with another disclosed aspect, an angiographic image processing system is disclosed, comprising: a filtering module configured to filter an angiographic image based on blood vessel diameter to identify neovasculature having small blood vessel diameter; and a display sub-system configured to display the angiographic image with the identified neovasculature.

In accordance with another disclosed aspect, a storage medium is disclosed storing instructions executable by a digital processor to perform an angiographic image processing method including filtering an angiographic image based on blood vessel diameter to identify neovasculature having small blood vessel diameter and computing a density of the identified neovasculature.

One advantage resides in more accurate neovascular imaging and characterization.

Another advantage resides in enabling disambiguation of neovasculature from obscuring vasculature or from other obscuring features.

Another advantage resides in enabling temporal profiling of angiogenesis using an angiographic image acquired at a single time rather than using multiple angiographic images acquired over an extended period of time.

Further advantages will be apparent to those of ordinary skill in the art upon reading and understand the following detailed description.

FIG. 1 diagrammatically shows an angiographic image acquisition and processing system.

Figure 2:
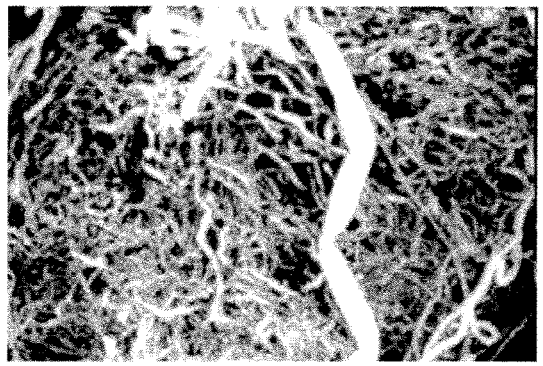

FIG. 2 shows an angiographic image acquired by the system of FIG. 1.

Figure 3:
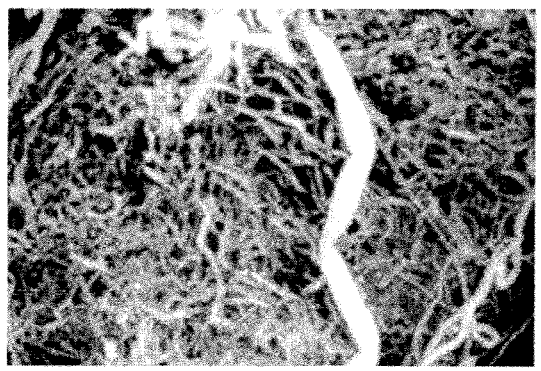
Figure 4:
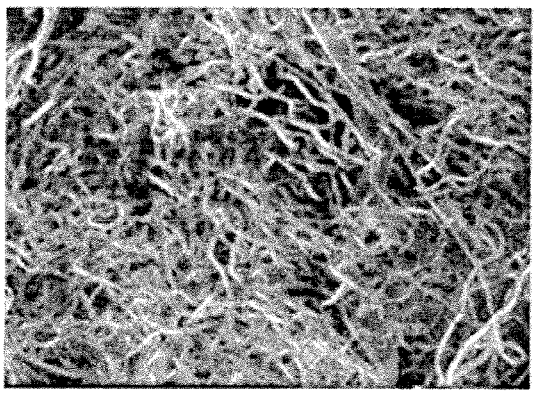
Figure 5:
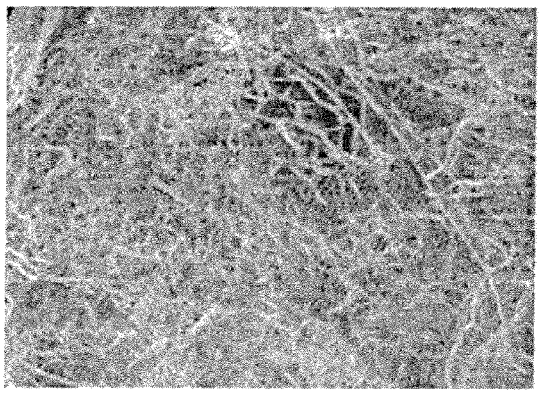

FIGS. 3, 4, and 5 shows the angiographic image of FIG. 2 filtered by the filtering module of the system of FIG. 1. FIG. 3 shows the angiographic image filtered using a second derivative of a Gaussian kernel with standard deviation $\sigma=0.06$ cm. FIG. 4 shows the angiographic image filtered using a second derivative of a Gaussian kernel with standard deviation $\sigma=0.03$ cm. FIG. 5 shows the angiographic image filtered using a second derivative of a Gaussian kernel with standard deviation $\sigma=0.01$ cm.

Figure 6:
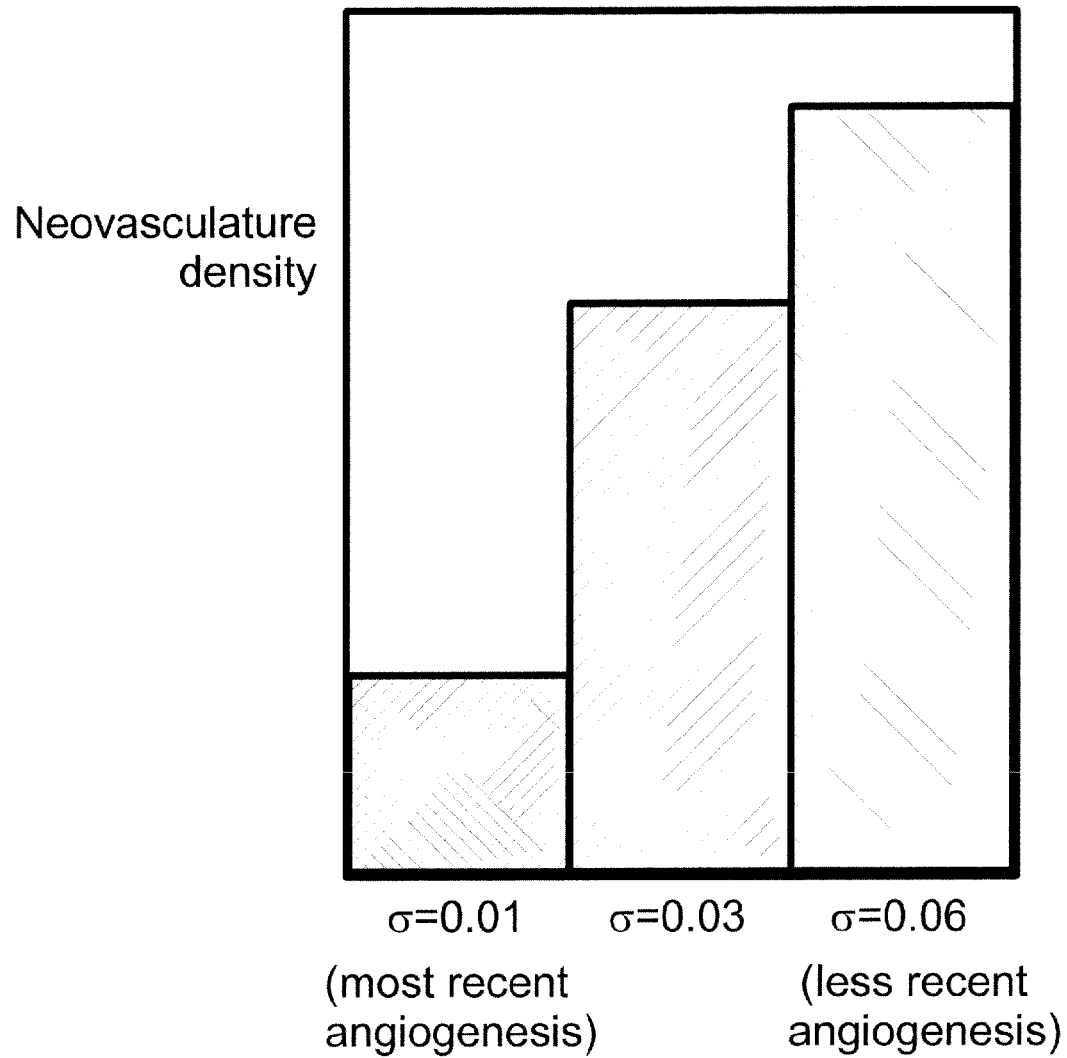

FIG. 6 diagrammatically shows a display of a graphical representation of the density of the neovasculature at the different small blood vessel diameters 0.01 cm, 0.03 cm, and 0.06 cm.

Figure 7:
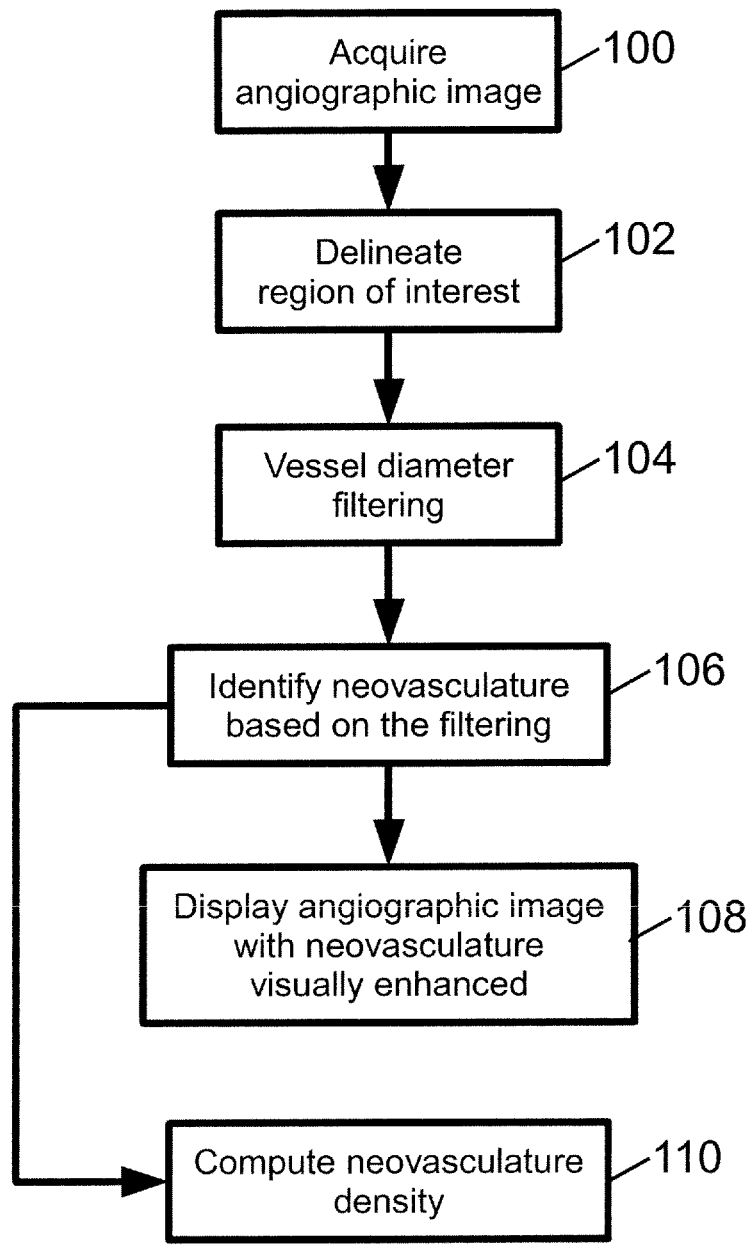

FIG. 7 diagrammatically shows a method suitably performed by the angiographic image acquisition and processing system of FIG. 1.

With reference to FIG. 1, an angiography system includes a computed tomography (CT) scanner 10 controlled by a CT controller 12 executing an angiography sequence 14. In the illustrated embodiment, the CT scanner 10 is a Brilliance CT scanner (available from Koninklijke Philips Electronics N.V., Eindhoven, The Netherlands), although other CT scanners can also be used. Still further, other imaging modality scanners or devices capable of acquiring angiographic images can be used, such as a magnetic resonance (MR) scanner, a gamma camera configured to perform single-photon emission computed tomography (SPECT), a positron emission tomography (PET) scanner, an fluoroscope, or so forth. Optionally, a vascular contrast agent 16 is administered to the subject (which may, in general, be either a human subject or an animal subject) as part of the angiography sequence 14 in order to enhance vascular contrast in the acquired imaging data. For example, an intravascular contrast agent bolus can be administered intravascularly at a suitable time interval before imaging data acquisition.

The CT scanner 10 controlled by the CT controller 12 executing the angiography sequence 14 generates CT image data suitably buffered or stored in a CT scanner data memory 18 and suitably reconstructed by a reconstruction module 20 to generate an angiographic image. For the illustrated example of CT imaging data, the reconstruction module 20 can suitably employ filtered backprojection, iterative backprojection/forward projection, or another suitable reconstruction technique. More generally, the reconstruction module employs a reconstruction technique that is suitable for the imaging modality employed in acquiring the angiographic imaging data. For example, if the angiographic data are acquired using a MR scanner, then the reconstruction module suitably employs a Fourier transform-based reconstruction or another MR-compatible reconstruction algorithm.

The angiographic image is optionally processed by an image processing/segmentation module 22. This processing can entail any desired pre-processing and/or segmentation of the angiographic image. Segmentation, if performed, entails delineating a region of interest for further processing. For example, the image processing/segmentation module 22 may provide a graphical user interface displaying various views of the angiographic image and providing a mouse pointer or other user interface for enabling a human user to delineate a cancerous tumor or other region of interest in the angiographic image, for example by encircling the region of interest using the mouse pointer to trace out an encircling line in axial, sagittal, and coronal views, with contours interpolated between the delineated encirclements or other delineation points. A computer 30 including a display 32 and one or more user input devices such as an illustrated mouse 34 and keyboard 36 is suitably used as the user interfacing hardware. The image processing/segmentation module 22 optionally performs other image processing, either over the whole angiographic image or limited to the region of interest. Such image processing may include, for example: thresholding pixels or voxels to suppress or remove soft tissue signal; performing selected data format conversion; spatially registering the region of interest with a spatial reference; or so forth. The angiographic image after optional image processing and/or segmentation is suitably stored in an image memory 24.

A filtering module 40 (delineated by a dashed box in diagrammatic FIG. 1) is configured to filter the angiographic image (including at least the region of interest) respective to one or more different small blood vessel diameters to identify neovasculature having one or more different small blood vessel diameters. In the illustrated embodiment, the filtering module 40 includes a convolution module 42 that convolves the angiographic image with a second derivative of a Gaussian kernel 44 having a standard deviation σ 46 corresponding to a selected small blood vessel diameter. For a three-dimensional angiographic image, this convolution may in general be performed in each of three orthogonal directions (e.g., x-, y-, and z-directions of a Cartesian coordinate system) to generate a Hessian matrix map in which each voxel is represented by the Hessian matrix:

$$H(x, y, z) = \begin{bmatrix} I_{xx} & I_{xy} & I_{xz} \\ I_{yx} & I_{yy} & I_{yz} \\ I_{zx} & I_{zy} & I_{zz} \end{bmatrix}, \quad (1)$$

where:

$$I_{xx}(x, y, z, \sigma) = \left\{ \frac{\partial^2}{\partial x^2} G(x, y, z, \sigma) \right\} \otimes I(x, y, z), \quad (2)$$

where I(x,y,z) is a voxel of the angiographic image (optionally after image processing and/or segmentation by the module 22), G(x,y,z,σ) is a Gaussian kernel with standard deviation σ, and the symbol "⊗" denotes the convolution operator. The diagonal terms $I_{yy}$ and $I_{zz}$ are analogous to Equation (2), and the cross-terms are similarly represented, for example as:

$$I_{xy}(x, y, z, \sigma) = \left\{ \frac{\partial^2}{\partial x \partial y} G(x, y, z, \sigma) \right\} \otimes I(x, y, z). \quad (3)$$

The Hessian matrix H(x,y,z) is computed for voxels of the angiographic image to generate a Hessian matrix map that is suitably stored in a Hessian matrix map memory 50.

An eigenanalysis module 54 performs an eigenanalysis on the Hessian matrices of the Hessian matrix map to extract eigenvalues of the Hessian matrices which are suitably stored in an eigen-map memory 56. If a given Hessian matrix is generated for a voxel that is positioned at about the center of a neovascular vessel having small blood vessel diameter σ, then it is expected that the eigenvalue corresponding to the eigenvector oriented along the direction of the neovascular vessel will be approximately zero, that is, $\lambda_1 \approx 0$, because the intensity gradient along the center of the neovascular vessel is generally small or zero. The remaining two eigenvalues $\lambda_2, \lambda_3$ for the voxel at about the center of the neovascular vessel correspond to eigenvectors oriented transverse to the direction of the neovascular vessel and should represent relatively large curvatures on the scale of σ. These eigenvalues $\lambda_2, \lambda_3$ should have relatively large values that are approximately equal, that is, $\lambda_2 > 0$, $\lambda_3 > 0$, and $\lambda_2 \approx \lambda_3$.

Accordingly, a neovasculature identification module 60 receiving the eigen-map can identify voxels at the center of neovascular vessels by identifying eigenvalue triplets ($\lambda_1, \lambda_2, \lambda_3$) where $\lambda_1 \leq \lambda_2 \leq \lambda_3$ that satisfy the conditions: $\lambda_1 \approx 0$; $\lambda_2, \lambda_3 > 0$; and $\lambda_2 \approx \lambda_3$. The result can be stored as a neovasculature map in a map memory 62. The neovasculature mapping information can be stored in various ways. For example, in one approach voxels that satisfy the conditions $\lambda_1 \approx 0$; $\lambda_2, \lambda_3 > 0$; and $\lambda_2 \approx \lambda_3$, are set equal to some positive value while voxels that do not satisfy these conditions are set equal to zero. In another approach, the voxels are assigned values:

$$V(x, y, z) = \exp\left(-\frac{a^2 + b^2}{2\sigma^2}\right), \quad (4)$$

where the parameters a and b represent distance from the neovascular vessel spine (identified by the conditions $\lambda_1 \approx 0$; $\lambda_2, \lambda_3 > 0$; and $\lambda_2 \approx \lambda_3$) along the respective directions of the eigenvectors corresponding to $\lambda_2$ and $\lambda_3$. Equation (4) provides some width to the mapped neovascular vessels. Optionally, the parameters a and b are scaled by the magnitudes of the corresponding eigenvalues $\lambda_2$ and $\lambda_3$.

The illustrated components 42, 54 of the filtering module 40, and the illustrated neovasculature identification module 60, are illustrative examples. Other approaches for performing angiographic image filtering based on blood vessel diameter can also be used, such as those disclosed in Suri et al., U.S. Pat. No. 7,024,027 which is incorporated herein by reference in its entirety.

The filtering module 40 as disclosed herein employs a selected small blood vessel diameter σ, so as to identify neovasculature. The neovascular vessels have diameter comparable with the selected small blood vessel diameter σ, and hence are identified by the filtering module 40. On the other hand, more established vascular vessels have generally larger vessel diameter, and the filtering module 40 "filters out" the more established vasculature having substantially larger diameter. Other methods for identifying the neovasculature can be used. For example, selection of neovasculature can be done using a tracing or growth tree approach, in which vasculature of a selected small blood vessel diameter within a region of interest are selected as seed points, and the next-larger diameter neovasculature that connect back to the seed point are selected, and so forth.

In some applications, it may be of value to identify neovasculature of different small blood vessel diameters. For example, the typical small blood vessel diameter for neovasculature may be unknown a priori. As another example, the neovasculature may in some instances span a range of small blood vessel diameters that is too large to capture using a single selected small blood vessel diameter σ. In the latter situation, the neovasculature with the smallest blood vessel diameter represents the most recent angiogenesis; whereas, the neovasculature with larger (but still small) blood vessel diameter represents less recent angiogenesis. By determining neovasculature of different small blood vessel diameters, a wider range of neovasculature can be identified, and angiogenesis over time can be estimated in a quantitative or semi-quantitative fashion. Toward this end, a looping operator 64 optionally invokes the filtering module 40 iteratively, with different small blood vessel diameters σ, to generate neovasculature maps reflective of different small blood vessel diameters. This enables a different neovascular map to be generated for each different small blood vessel diameter σ, with the different maps suitably stored in the memory 62 as different map objects or as a single "composite" map object that additively combines the different maps.

A display sub-system including the display 32 and an image rendering module 70 is configured to display the angiographic image with the identified neovasculature visually enhanced. In some embodiments, the angiographic image is displayed with the neovasculature identified or highlighted by color. In some embodiments, the angiographic image is not displayed, but rather the neovasculature (that is, the neovasculature map stored in the memory 62) is displayed with pixels or voxels of the angiographic image not identified as neovasculature set at a background intensity. In another approach, the neovasculature map is used as an "opacity" mask that turns on voxels of the angiographic image that are identified as part of the neovasculature while turning off voxels of the angiographic image that are not identified as part of the neovasculature.

If the filtering module 40 is executed a plurality of times to map neovasculature of different small blood vessel diameters, then the angiographic image can be displayed with the neovasculature color-coded by small blood vessel diameter. For example, the newest neovasculature (that is, the neovasculature having the smallest small blood vessel diameter) are suitably displayed in red, while the oldest neovasculature (that is, the neovasculature having the largest small blood vessel diameter) are suitably displayed in blue, with vasculature of intermediate small blood vessel diameter (if any are identified) are displayed in intermediate colors between red and blue in the color spectrum.

Besides colorizing and intensity suppression, other visual effects can be used to visually enhance the neovasculature in the displayed angiographic image, such as texturing, dynamic intensity variation (so as to visually "flash" the neovasculature on and off), or so forth. The displayed image with visually enhanced neovasculature can be displayed in various formats, such as three-dimensional renderings (preferably automatically rotating and/or manually rotatable by the use of the mouse 34), maximum intensity projection (MIP), selected two-dimensional slice display, or so forth.

With reference to FIGS. 2-5, examples are illustrated. FIG. 2 shows a MIP of an angiographic image without filtering. FIGS. 3, 4, and 5 show MIP images filtered to enhance neovasculature at σ=0.06 cm, σ=0.03 cm, and σ=0.01 cm, respectively. To perform neovasculature identification, the soft tissue within the tumor volume was suppressed by applying a threshold to the intensity distribution of the tumor volume. The Eigen values of the Hessian matrix were computed at various scales (σ=0.06 cm, σ=0.03 cm, and σ=0.01 cm) of the Gaussian kernel to enhance vasculature of different diameters in the thresholded volume. The criteria $\lambda_1 \approx 0$; $\lambda_2, \lambda_3 > 0$; and $\lambda_2 \approx \lambda_3$ were used for detecting the voxels belonging to the vasculature. The MIP image of enhanced vessels at the different Gaussian scales are shown in FIGS. 3-5. For a given standard deviation of the Gaussian, blood vessels of the same scale (radius) in the input volume are enhanced.

The vesselness responses at different scales are optionally combined into a single volume by selecting maximum response among the multiple scales. Another volume, a scale encoded one, is created with voxel values indicating the scale at which the vesselness response was maximum.

In addition to visual display, the neovasculature data can be utilized to compute quantitative characteristic values. For example, an illustrated neovasculature density computation module 72 computes a neovasculature density based on the neovasculature map stored in the memory 62. If a single small blood vessel diameter is used to generate a single neovasculature map, or if multiple small blood vessel diameters are used to generate multiple neovasculature maps that are fused together, then the output of the neovasculature density computation module 72 is a single density value. If a plurality of small blood vessel diameters are used to generate multiple neovasculature maps that are stored separately, then the neovasculature density computation module 72 optionally computes a separate neovasculature density value for each different small blood vessel diameter.

With reference to FIG. 6, in this latter case the different neovasculature density values for the different small blood vessel diameters are optionally displayed by the display sub-system as a graphical representation of the density of the neovasculature at the different small blood vessel diameters. FIG. 6 illustrates an example in which the graphical representation is a histogram having neovasculature density bars for the three different small blood vessel diameters σ=0.06 cm, σ=0.03 cm, and σ=0.01 cm, respectively. In FIG. 6, the trend is toward lower density of newer neovasculature (that is, smaller-diameter neovasculature) as compared with older (larger diameter) neovasculature. A physician, oncologist, or other medical professional might view this trend as evidence of reduced cancerous tumor growth, although the trend by itself would likely be viewed to be insufficient data by itself to draw such a conclusion. Such tracking of angiogenesis over time using a single image acquired at a single time is not possible with conventional angiography techniques. Heretofore, tracking of angiogenesis over time has entailed acquiring images over an extended period of time to ascertain the development of the neovasculature over the extended period of time.

In similar fashion, the data of FIG. 6 may be used to extract information about angiogenesis rate and trending. For example, a neovasculature growth model $t=f(\sigma)$ suitably indicates the time t since angiogenesis for neovasculature to grow to vessel diameter σ. The measured neovasculature density as a function of small blood vessel diameter σ (e.g., as shown in FIG. 6) can be represented as $\rho(\sigma)$. The angiogenesis rate at a time t before acquisition of the angiographic image can be suitably written as $R(t)$. Using these or similar relationships, the angiogenesis rate $R(t)$ can be estimated based on the measured neovasculature density $\rho(\sigma)$. The angiogenesis rate, in turn, may be viewed as a quantitative measure of the cancerous tumor growth rate, since rapid cancer growth is typically accompanied by a high rate of angiogenesis in the tumor region.

With reference to FIG. 7, a method suitably performed by the angiographic image acquisition and processing system of FIG. 1 is described. In a process operation 100, an angiographic image is acquired using the illustrated CT scanner 10 or another imaging modality configured for angiographic imaging. In an optional process operation 102, a region of interest is delineated, for example using the illustrated image processing/segmentation module 22. Alternatively, process operation 102 can be omitted and the entire angiographic image or a preselected portion thereof is taken as the region of interest. A vessel diameter filtering operation 104 is performed by the filtering module 40, using a value or plurality of values for the small vessel diameter σ 46 corresponding to neovasculature. In a process operation 106, neovasculature is identified based on the filtering by the neovasculature identification module 60. In other contemplated embodiments, the filtering operation 104 employs a region growing technique or other suitable technique to identify vasculature, and the neovasculature identification operation 106 identifies portions of the identified vasculature regions having small diameter corresponding to neovasculature. In an optional process operation 108, the angiographic image is displayed via the rendering and display components 32, 70 with the neovasculature visually enhanced, for example by highlighting or specially coloring the neovasculature, or by displaying angiographic image portions other than the neovasculature in a "greyed-out" or otherwise deemphasized fashion, or by using another visual enhancement. In an optional process operation 110, density of the identified neovasculature is computed by the neovasculature density computation module 72, and the computed neovasculature density is suitably displayed on the display 32, stored in a memory, used to compute other useful information, or so forth.

The various computational and control components 12, 20, 22, 40, 60, 64, 70 disclosed herein can be implemented in various ways, for example by a computer or other device including a digital processor and programmed or including firmware to perform the disclosed processing, or by hybrid or analog circuitry configured to perform the disclosed processing or portions thereof, or so forth. In some embodiments the computational components 12, 20, 22, 40, 60, 64, 70 may be embodied by the illustrated computer 30 having suitable firmware or programming. The neovasculature imaging and characterization techniques disclosed herein can be implemented by such a processor or other hardware, and/or can be embodied as a storage medium storing instructions that when executed by such a processor or other hardware perform the disclosed methods. Such a storage medium may be embodied by one or more types of storage media, such as one or more of: a magnetic disk; an optical disk; a FLASH memory or other electrostatic memory; a random access memory (RAM); a read-only memory (ROM); or so forth.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for imaging neovasculature, the method comprising:
    acquiring an angiographic image;
    filtering the angiographic image based on blood vessel diameter for two or more different small blood vessel diameters to identify vasculature of two or more different small blood vessel diameters as neovasculature;
    computing a density of the identified neovasculature of the different small blood vessel diameters to determine a measured neovasculature density ρ(σ) as a function of small blood vessel diameter σ; and
    estimating an angiogenesis rate R(t) based on the measured neovasculature density ρ(σ) as a function of small blood vessel diameter σ and a neovasculature growth model t=f(σ) indicating the time t since angiogenesis for neovasculature to grow to vessel diameter σ.

2. The method as set forth in claim 1, further comprising displaying displaying the angiographic image with the identified neovasculature including at least one of (i) displaying the angiographic image with the neovasculature identified or highlighted by color, and (ii) displaying the identified neovasculature with pixels or voxels of the angiographic image not identified as neovasculature set at a background intensity.

3. The method as set forth in claim 1, further comprising:
    plotting a histogram of density of the identified neovasculature of the different blood vessel diameters as a function of small blood vessel diameter.

4. The method as set forth in claim 1, wherein the filtering comprises:
    convolving the angiographic image with a second derivative of a Gaussian kernel having a standard deviation corresponding to a selected small blood vessel diameter.

5. The method as set forth in claim 4, wherein the filtering further comprises:
    computing eigenvalues of a Hessian matrix of the angiographic image convolved with said second derivative of said Gaussian kernel.

6. The method as set forth in claim 5, wherein the filtering further comprises:
    detecting a location of neovasculature in the angiographic image based on satisfying the conditions that (i) one eigenvalue of the Hessian matrix at the location is approximately zero and (ii) two other eigenvalues of the Hessian matrix at the location are greater than zero and approximately equal to each other.

7. The method as set forth in claim 1, further comprising:
    segmenting the angiographic image to identify a region of interest, the filtering being applied to the region of interest; and
    thresholding pixels or voxels of the region of interest to suppress soft tissue signal.

8. An angiographic image processing system comprising:
    a filtering module configured to filter an angiographic image respective to a plurality of different blood vessel diameters to identify neovasculature having different small blood vessel diameters; and
    a neovasculature density computation module configured to compute density of the neovasculature identified by the filtering module at the different small blood vessel diameters to determine a measured neovasculature density as a function of small blood vessel diameter and estimate an angiogenesis rate based on the measured neovasculature density and a neovasculature growth model t=f(σ) indicating the time t since angiogenesis for neovasculature to grow to vessel diameter σ.

9. The angiographic image processing system as set forth in claim 8, further comprising a display sub-system configured to display the angiographic image with the identified neovasculature including visual enhancement of the identified neovasculature by at least one of (i) removing or suppressing intensity of pixels or voxels not part of the identified neovasculature, and (ii) colorizing or enhancing intensity of pixels or voxels of the identified neovasculature.

10. The angiographic image processing system as set forth in claim 8, further comprising:
    a display sub-system configured to display a graphical representation of the density of the neovasculature at the different small blood vessel diameters.

11. The angiographic image processing system as set forth in claim 8, wherein the filtering module is configured to convolve the angiographic image with a second derivative of a Gaussian kernel having a standard deviation corresponding to a selected small blood vessel diameter.

12. The angiographic image processing system as set forth in claim 11, wherein the filtering module is further configured to perform an eigenanalysis on the angiographic image convolved with the derivative of the Gaussian kernel, the neovasculature being identified based on eigenvalues output by the eigenanalysis.

13. A non-transitory storage medium storing instructions executable by a digital processor to perform an angiographic image processing method including filtering an angiographic image for different blood vessel diameters to identify neovasculature having different small blood vessel diameters, computing a density of the identified neovasculature of the different blood vessel diameters to generate density values for neovasculature of the different blood vessel diameters, and estimating an angiogenesis rate based on the measured neovasculature density and a neovasculature growth model $t=f(\sigma)$ indicating the time t since angiogenesis for neovasculature to grow to vessel diameter $\sigma$.

14. The non-transitory storage medium as set forth in claim 13, wherein the filtering includes convolving the angiographic image with a second derivative of a Gaussian kernel having a standard deviation corresponding to a selected small blood vessel diameter.

15. The non-transitory storage medium as set forth in claim 14, wherein the filtering further includes identifying neovasculature of the selected small blood vessel diameter based on eigenanalysis of the convolved angiographic image.

16. The non-transitory storage medium as set forth in claim 13, wherein the method performed by execution of the stored instructions by a digital processor further includes generating an image of the neovasculature identified by the filtering and causing a display device to display the generated image.

* * * * *